(12) United States Patent
Kataoka et al.

(10) Patent No.: US 12,534,131 B2
(45) Date of Patent: Jan. 27, 2026

(54) STEERING CONTROL DEVICE

(71) Applicant: DENSO CORPORATION, Kariya (JP)

(72) Inventors: Motoaki Kataoka, Kariya (JP); Haruo Suzuki, Kariya (JP); Katsuya Fujisaki, Kariya (JP); Yusuke Otogawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 48 days.

(21) Appl. No.: 18/750,972

(22) Filed: Jun. 21, 2024

(65) Prior Publication Data

US 2024/0343305 A1 Oct. 17, 2024

Related U.S. Application Data

(63) Continuation of application No. PCT/JP2022/046811, filed on Dec. 20, 2022.

(30) Foreign Application Priority Data

Dec. 27, 2021 (JP) .................................. 2021-212119

(51) Int. Cl.
| | |
|---|---|
| *B62D 15/00* | (2006.01) |
| *B60W 30/12* | (2020.01) |
| *B60W 50/16* | (2020.01) |
| *B62D 6/06* | (2006.01) |
| *B62D 7/22* | (2006.01) |
| *B62D 15/02* | (2006.01) |

(52) U.S. Cl.
CPC ............ *B62D 15/025* (2013.01); *B60W 30/12* (2013.01); *B60W 50/16* (2013.01); *B62D 6/06* (2013.01); *B62D 7/222* (2013.01)

(58) Field of Classification Search
CPC .......... B62D 15/025; B62D 6/06; B62D 7/22; B62D 7/222; B62D 7/224; B62D 7/226; B62D 7/228; B60W 30/12; B60W 50/16
See application file for complete search history.

(56) References Cited

U.S. PATENT DOCUMENTS

| | | | |
|---|---|---|---|
| 2020/0269905 A1 | 8/2020 | Sugawara et al. | |
| 2024/0351439 A1* | 10/2024 | Zhong | ................... B60K 35/25 |
| 2025/0289461 A1* | 9/2025 | Yoshikawa | ........... B60W 40/08 |

FOREIGN PATENT DOCUMENTS

| | | |
|---|---|---|
| JP | 2015-033942 A | 2/2015 |
| JP | 2017-065587 A | 4/2017 |

* cited by examiner

*Primary Examiner* — Jacob M Amick
(74) *Attorney, Agent, or Firm* — Maschoff Brennan

(57) ABSTRACT

An assist control unit calculates an assist torque command based on a steering torque. A steering angle control unit calculates a steering angle control torque command so that a steering angle determined according to an output of a motor follows a target steering angle commanded from a lane keeping support device. A vibration application control unit calculates a lane departure warning control torque command to apply vibration to an assist torque when a lane departure warning activation request is notified. A motor drive control unit controls a drive of the motor based on an addition value of the assist torque command, the steering angle control torque command, and the lane departure warning control torque command. The steering angle control unit includes a vibration removal filter configured to remove vibration frequency components of the lane departure warning device in calculations on a steering angle signal loop for steering angle control.

8 Claims, 10 Drawing Sheets

LDW CONTROL ACTIVATED DURING LKA (WITHOUT VIBRATION REMOVAL FILTER)

STEERING CONTROL DEVICE

CROSS REFERENCE TO RELATED APPLICATIONS

This application is a continuation application of International Patent Application No. PCT/JP2022/046811 filed on Dec. 20, 2022, which designated the U.S. and based on and claims the benefits of priority of Japanese Patent Application No. 2021-212119 filed on Dec. 27, 2021. The entire disclosure of all of the above applications is incorporated herein by reference.

TECHNICAL FIELD

The present disclosure relates to a steering control device.

BACKGROUND

In a vehicle equipped with a lane keeping support device, a known steering control device assists a driver in steering using an assist torque output from a motor.

SUMMARY

An object of the present disclosure is to provide a steering control device that prevents a decrease in a recognition of a lane departure warning during operation of steering angle control using a lane keeping support control.

The present disclosure is a steering control device that assists a driver in steering using assist torque output from a motor in a vehicle equipped with a lane keeping support device and a lane departure warning device. This steering control device includes an assist control unit, a steering angle control unit, a vibration application control unit, and a motor drive control unit.

The assist control unit calculates an assist torque command based on the steering torque. The steering angle control unit calculates a steering angle control torque command so that the steering angle determined according to an output of a motor follows a target steering angle commanded from the lane keeping support device.

The vibration application control unit calculates a lane departure warning control torque command so as to apply vibration to the assist torque when the lane departure warning device requests activation of the lane departure warning.

The motor drive control unit controls a drive of the motor based on an addition value of the assist torque command, the steering angle control torque command, and the lane departure warning control torque command.

The steering angle control unit includes a vibration removal filter configured to remove vibration frequency components of the lane departure warning device in calculations on a steering angle signal loop for steering angle control.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
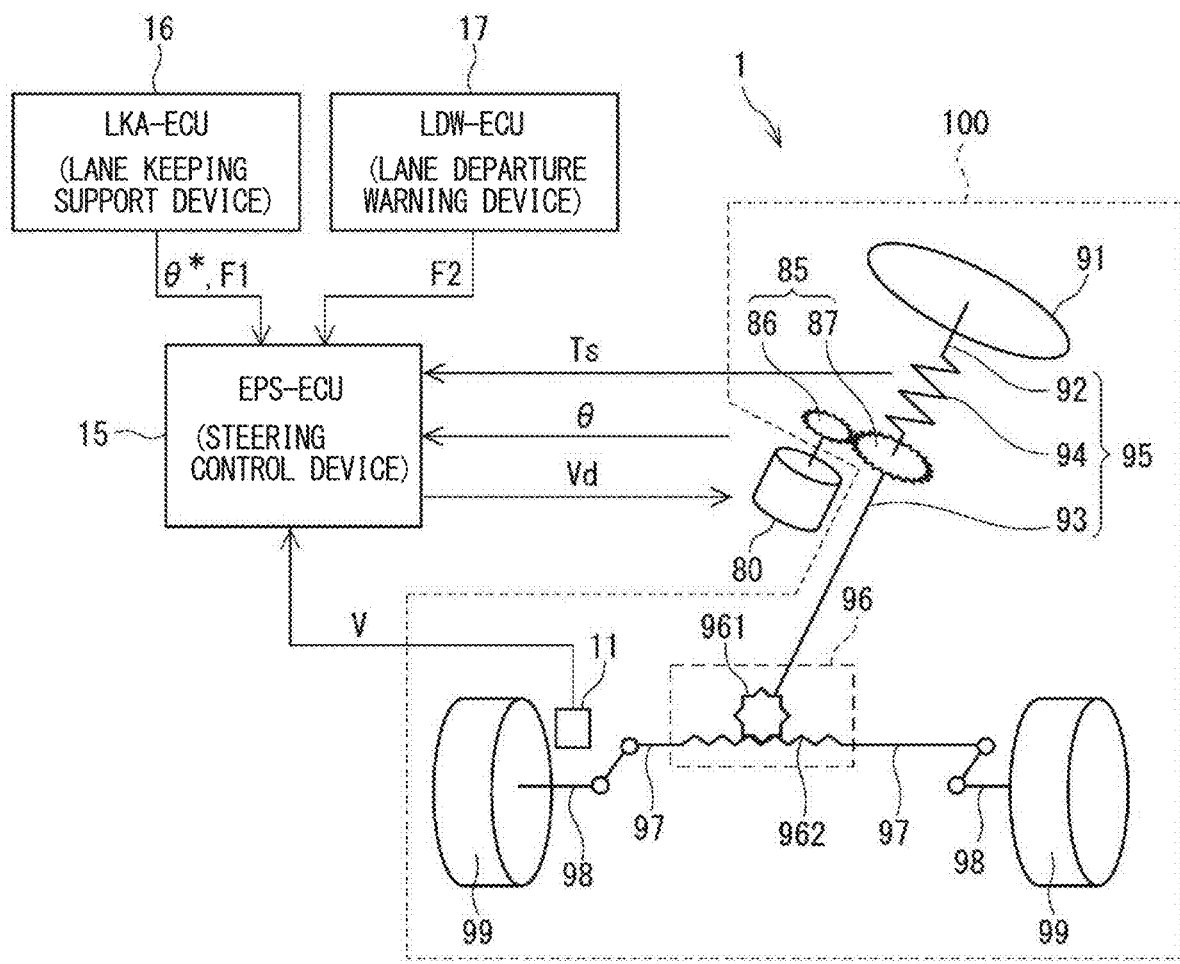
FIG. 1 is a schematic diagram showing an electric power steering system.

In a vehicle equipped with a lane keeping support device, a known steering control device assists a driver in steering using an assist torque output from a motor. In an assumable example, the vehicle steering device superimposes a vibration torque for lane departure warning on an assist torque, and changes the magnitude of the vibration torque depending on the driver's steering state.

In another assumable example of the motor control device, a target tracking control calculation unit calculates a steering angle steering torque command using a tracking control, that is, an automatic steering, that causes a steering angle to follow a target steering angle commanded by the lane keeping support device. The motor control device drives the motor according to an added value of an assist torque command for reducing steering load and a steering angle steering torque command for automatic steering, and reduces a responsiveness of the automatic steering when a driver intervenes.

During an operation of steering angle control by the automatic steering, the steering angle based on the motor angle generated when the motor is driven by applying the vibration torque for the lane departure warning is corrected so as to become the target steering angle. The vibration of the steering angle control cancel out the vibrations of the lane departure warning, so the vibrations that appear on the steering wheel when the lane departure warning is activated are smaller than when the assist is normally activated. Therefore, it becomes difficult for the driver to recognize the warning.

An object of the present disclosure is to provide a steering control device that prevents a decrease in a recognition of a lane departure warning during operation of steering angle control using a lane keeping support control.

The present disclosure is a steering control device that assists a driver in steering using assist torque output from a motor in a vehicle equipped with a lane keeping support device and a lane departure warning device. This steering control device includes an assist control unit, a steering angle control unit, a vibration application control unit, and a motor drive control unit.

The assist control unit calculates an assist torque command based on the steering torque. The steering angle control unit calculates a steering angle control torque command so that the steering angle determined according to an output of a motor follows a target steering angle commanded from the lane keeping support device.

The vibration application control unit calculates a lane departure warning control torque command so as to apply vibration to the assist torque when the lane departure warning device requests activation of the lane departure warning.

The motor drive control unit controls a drive of the motor based on an addition value of the assist torque command, the steering angle control torque command, and the lane departure warning control torque command.

The steering angle control unit includes a vibration removal filter configured to remove vibration frequency components of the lane departure warning device in calculations on a steering angle signal loop for steering angle control.

In the present disclosure, a desired vibration torque for lane departure warning can be generated by not suppressing the motor angle fluctuation of the vibration frequency for lane departure warning when steering angle control by lane keeping support control is operating. Therefore, the driver can recognize the warning even when the lane keeping support control is in operation.

A steering control device according to one embodiment will be described with reference to the drawings. The steering control device of the present embodiment is applied to an electric power steering system of a vehicle equipped with a lane keeping support device and a lane departure warning device. In one embodiment, the EPS-ECU corresponds to a "steering control device." Further, a LKA (Lane Keep Assist)-ECU corresponds to a "lane keeping assist device", and a LDW (Lane Departure Warning)-ECU corresponds to a "Lane Departure Warning Device". The LKA control means lane keeping support control, and the LDW control means lane departure warning control.

The LKA-ECU commands a target steering angle to maintain a lane in which the vehicle is traveling during automatic steering. The LDW-ECU issues a warning to the driver when the vehicle is about to deviate from its lane during driver steering or automatic steering. In place of or in addition to the alarm sound and display, the present embodiment vibrates the steering wheel in cooperation with the EPS-ECU. The EPS-ECU assists the driver in steering using the assist torque output from the motor.

Configuration of Electric Power Steering System

As shown in FIG. 1, an electric power steering system 1 is configured to assist a driver's operation of a steering wheel 91 by a driving torque of a motor 80. A steering wheel 91 is fixed to one end of a steering shaft 92, and an intermediate shaft 93 is provided on the other end of the steering shaft 92. The steering shaft 92 and the intermediate shaft 93 are coupled by a torsion bar of a torque sensor 94. These components provide a steering shaft 95. The torque sensor 94 is provided to detect a steering torque Ts based on a torsion angle of the torsion bar.

A gear box 96 including a pinion gear 961 and a rack 962 is provided at an end portion of the intermediate shaft 93 opposite to the torque sensor 94. When a driver rotates the steering wheel 91, the pinion gear 961 rotates together with the intermediate shaft 93, and the rack 962 moves to the right and left with the rotation of the pinion gear 961. Tie rods 97 are provided at both ends of the rack 962 and coupled to tires 99 via knuckle arms 98. The tie rods 97 reciprocate right and left to pull and push the knuckle arms 98 and change the direction of the tires 99.

The motor 80 is, for example, a three-phase AC brushless motor. The motor 80 outputs the driving torque based on a drive voltage Vd output from the EPS-ECU 15. When the motor 80 is provided by the three-phase AC motor, the drive voltage Vd means each phase voltage of U phase, V phase and W phase. Rotation of the motor 80 is transmitted to the intermediate shaft 93 via a speed reduction mechanism 85 having a worm gear 86, a worm wheel 87 and the like. In addition, steering rotation of the steering wheel 91 and rotation of the intermediate shaft 93 caused by a reaction force from a road surface are transmitted to the motor 80 via the speed reduction mechanism 85.

The electric power steering system 1 shown in FIG. 1 is a column-assisted type in which the rotation of the motor 80 is transmitted to the steering shaft 95. However, the EPS-ECU 15 of the present embodiment may be applied to an electric power steering system of a rack assist type or to a steer-by-wire system in which a steering wheel and road wheels are mechanically separated. In another embodiment, a multi-phase AC motor other than three phases or a DC motor with brushes may be used as the motor.

Here, the entire structure from the steering wheel 91 to the tires 99 to which the steering force of the steering wheel 91 is transmitted is referred to as a steering system mechanism 100. The EPS-ECU 15 controls the steering torque Ts generated by the steering system mechanism 100 by controlling a driving torque output by the the motor 80 to the steering system mechanism 100. The EPS-ECU 15 obtains the steering torque Ts and the steering angle θ from the steering system mechanism 100. Further, the EPS-ECU 15 acquires a vehicle speed V detected by a vehicle speed sensor 11 provided at a predetermined part of the vehicle.

Further, the EPS-ECU 15 acquires a target steering angle θ* and a steering angle control request flag F1 from the LKA-ECU 16, and acquires a LDW activation request flag F2 from the LDW-ECU 17. During automatic steering, the LKA-ECU 16 outputs a steering angle control request flag F1 to the EPS-ECU 15. As referred to in Patent Document 2 (Japanese Unexamined Patent Publication No. 2015-33942), the LKA-ECU 16 sets a target course based on a driving lane and a position of the own vehicle detected from the video of the on-board camera, and outputs a target steering angle θ* for traveling along the target course to the EPS-ECU 15.

As referred to in Patent Document 1 (Japanese Unexamined Patent Application Publication No. 2017-65587), the LDW-ECU 17 determines whether there is a possibility that the vehicle will deviate from its lane or collide with an obstacle, based on the steering angle, vehicle speed, video from the on-board camera, yaw rate, lateral acceleration, etc. When determining that there is a possibility of lane departure or collision with an obstacle, the LDW-ECU 17 outputs an LDW activation request flag F2 to the EPS-ECU 15.

The EPS-ECU 15 operates using electric power from an on-vehicle battery (not shown), and calculates each torque command, which will be described later, based on the acquired information. The EPS-ECU 15 drives the motor 80 by applying a drive voltage Vd to the motor 80 according to the calculated addition value of each torque command. Various processes in the EPS-ECU 15 may be software processes of a program stored in a tangible memory device such as a ROM and executed by a CPU, or may be hardware processes executed by discrete electronic circuits.

Configuration of EPS-ECU

One Embodiment

Figure 2:
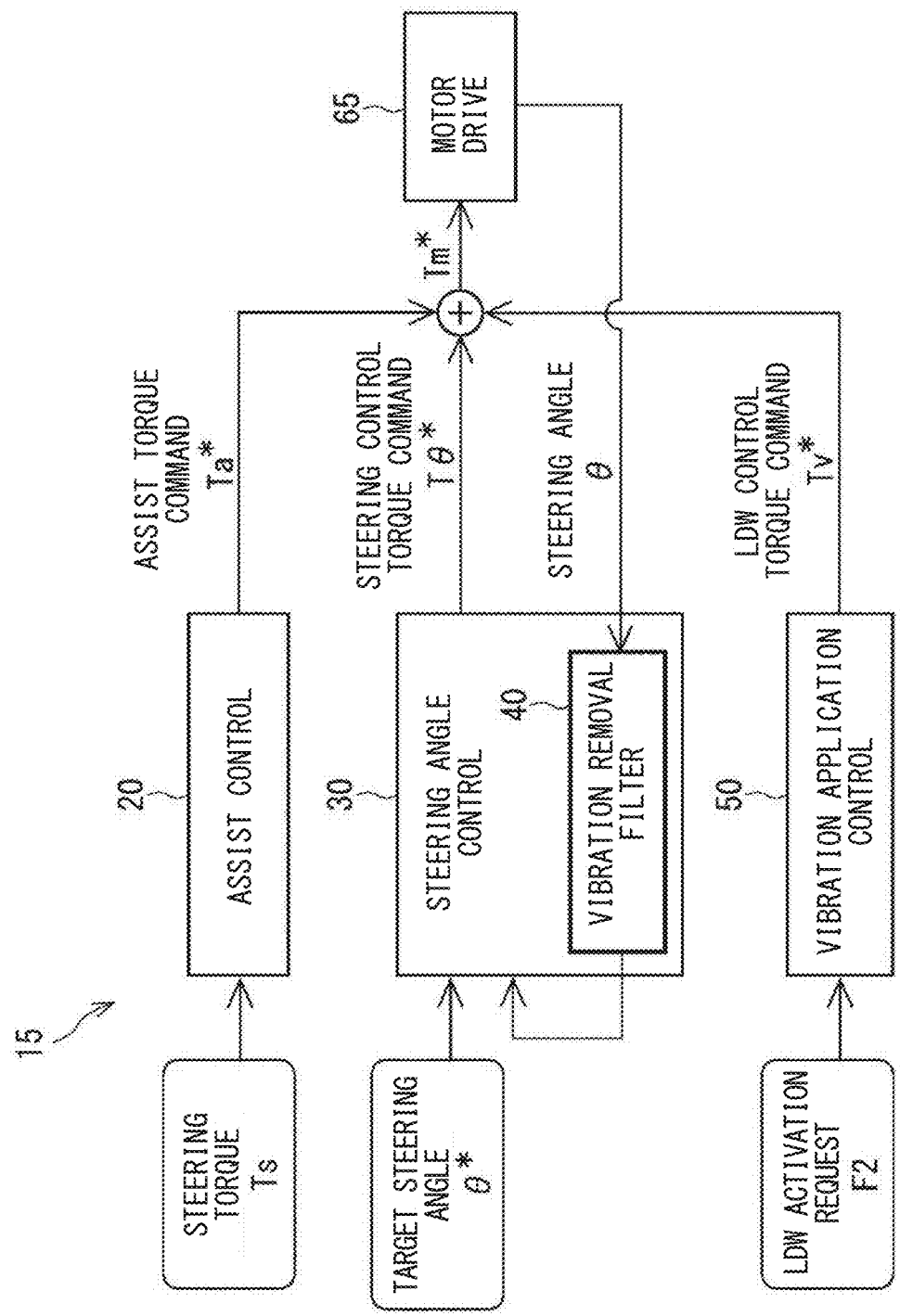
FIG. 2 is a schematic configuration diagram of one embodiment.

FIG. 2 shows a schematic configuration of the EPS-ECU 15 of the present embodiment. In the EPS-ECU 15, a motor drive control unit 65 controls the drive of the motor based on an additional value Tm* of an assist torque command Ta* by an assist control unit 20, a steering angle control torque command Tθ* by a steering angle control unit 30, and a LDW control torque command Tv* by a vibration application control unit 50. The steering angle θ determined according to the output of the motor is fed back to the steering angle control unit 30.

The assist control unit 20 calculates an assist torque command Ta* according to the driver's steering torque Ts. The steering angle control unit 30 calculates a steering angle control torque command Tθ* so that the steering angle θ follows the target steering angle θ* commanded from the LKA-ECU 16. The vibration application control unit 50 calculates a LDW control torque command Tv* so as to apply vibration to the assist torque when the LDW-ECU 17 notifies the LDW activation request using the flag F2.

The steering angle control unit 30 includes a vibration removal filter 40 that removes vibration frequency components of the LDW in calculations on the steering angle signal loop for steering angle control.

Figure 3:
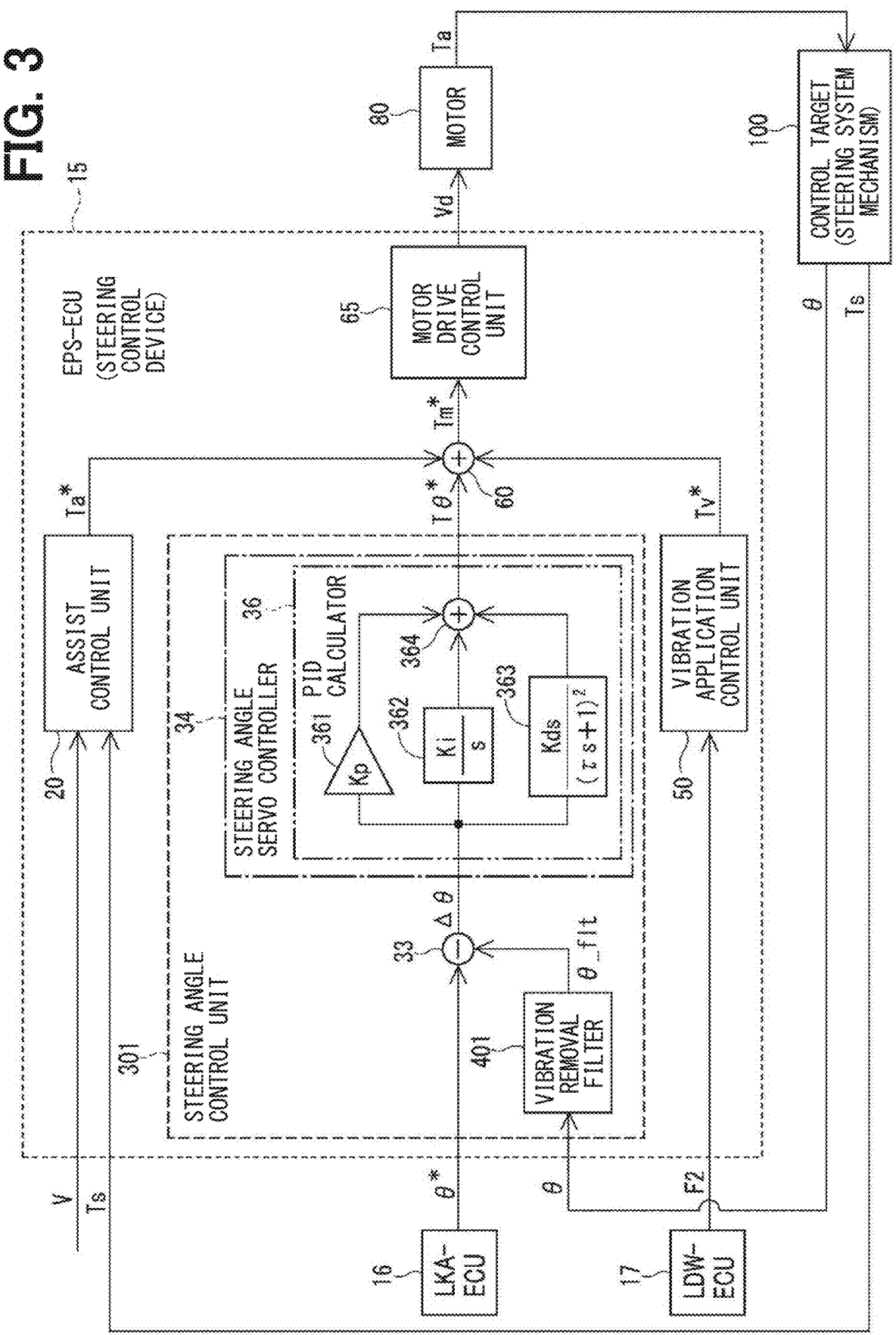
FIG. 3 is a block diagram of an EPS-ECU (steering control device) of one embodiment.
Figure 10A:
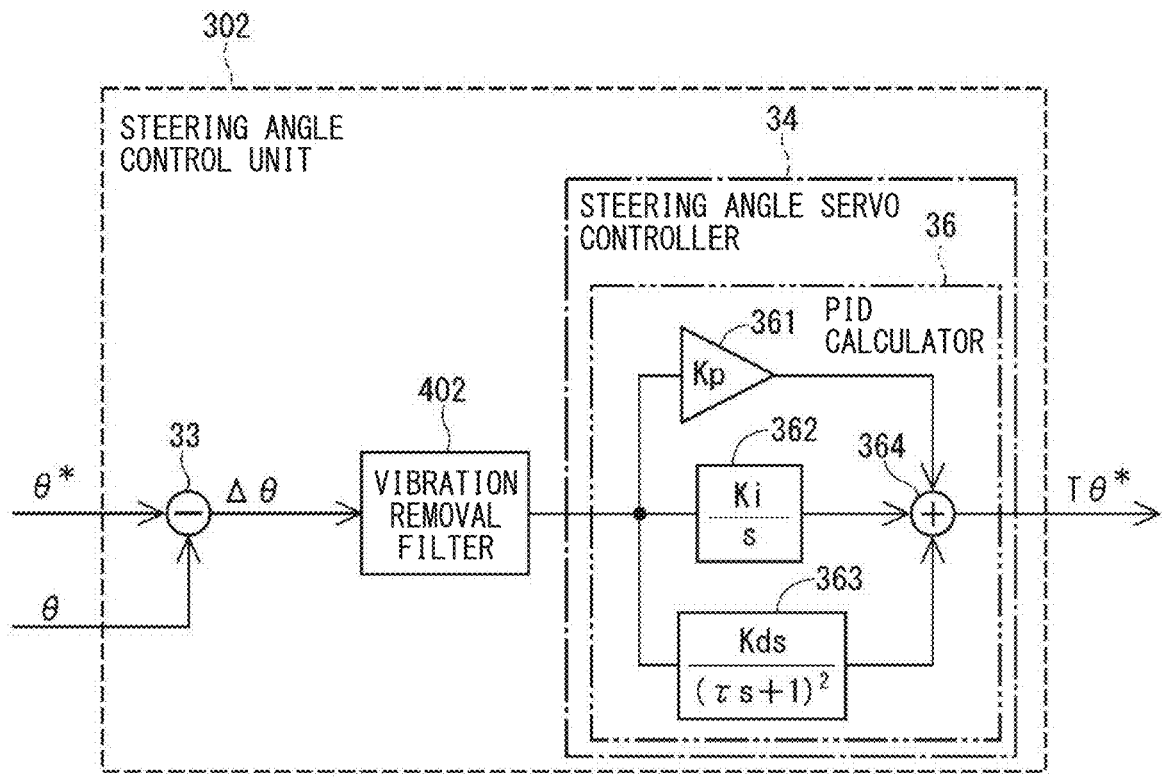
FIG. 10A is a block diagram of a steering angle control unit of another embodiment.
Figure 10B:
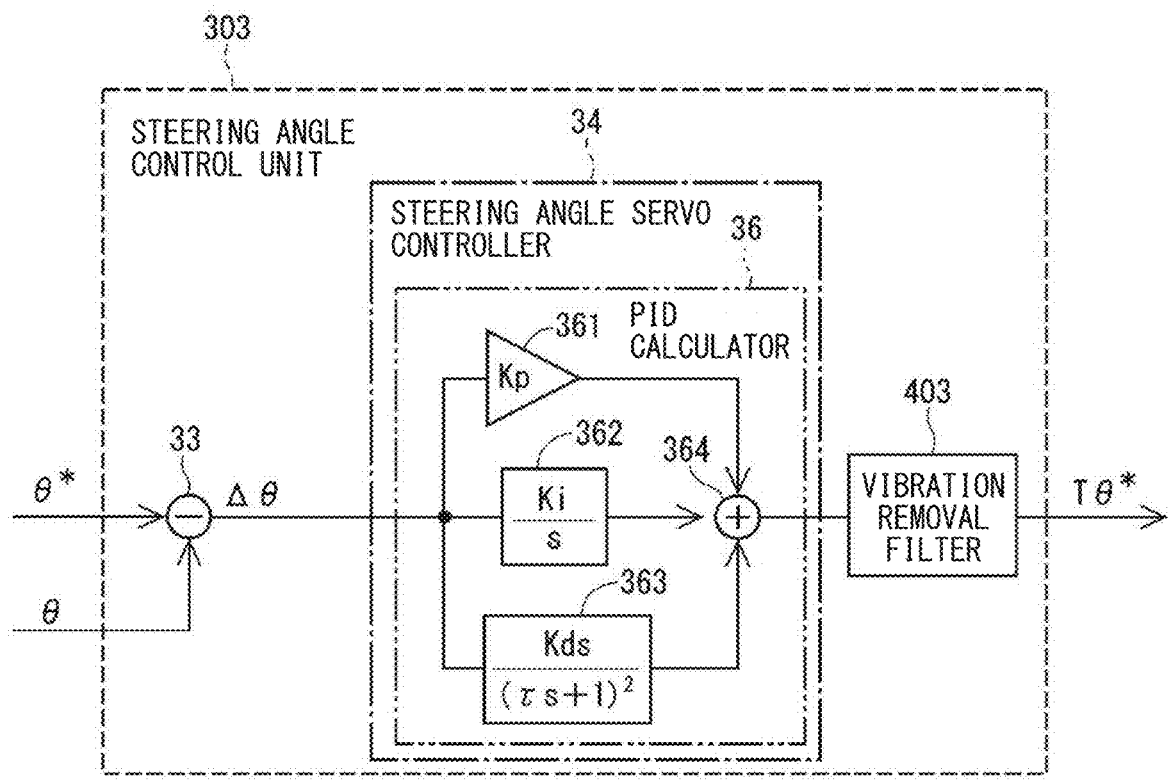
FIG. 10B is a block diagram of a steering angle control unit according to another embodiment.

FIG. 3 shows a specific configuration of the EPS-ECU 15. An arrangement of the vibration removal filter in the steering angle control unit is an example. Therefore, in FIG. 2, generic symbols "steering angle control unit 30" and "vibration removal filter 40" are written, whereas in FIG. 3, "steering angle control unit 301" and "vibration removal filter 401" are written. Another arrangement example of the vibration removal filter in the steering angle control unit is shown in FIGS. 10A and 10B.

The positive and negative signs of each torque command Ta*, Tθ*, Tv*, Tm* is defined according to a rotational direction in which the torque is applied. For example, the torque applied in the counterclockwise direction is defined as positive, and the torque applied in the clockwise direction is defined as negative. Regarding the positive and negative signs of the steering angle θ, for example, an angle to the left of the neutral position is defined as positive, and an angle to the right of the neutral position is defined as negative.

The EPS-ECU 15 includes the assist control unit 20, the steering angle control unit 30, the vibration application control unit 50, the motor drive control unit 65, and the like. The configuration of each unit will be explained in more detail, although it partially overlaps with the explanation of FIG. 2. The assist control unit 20 calculates an assist torque command Ta* based on the steering torque Ts and the vehicle speed V so that a transmission feeling corresponding to the road reaction force (or road surface load) and a feeling corresponding to the steering state are realized.

The steering angle control unit 30 includes a steering angle deviation calculator 33, a steering angle servo controller 34, and a vibration removal filter 401. The steering angle deviation calculator 33 calculates a steering angle deviation $\Delta\theta(=\theta^*-\theta)$ between the target steering angle θ* commanded by the LKA-ECU 16 and the steering angle θ.

The steering angle servo controller 34 has a PID calculator 36 including a proportional calculator 361, an integral calculator 362, a differential calculator 363, and an adder 364. Kp, Ki, and Kd in the figure represent a proportional gain, an integral gain, and a differential gain, respectively, s represents a Laplace operator, and T represents a time constant. The steering angle servo controller 34 calculates the steering angle control torque command Tθ* by a PID control so that the steering angle θ follows the target steering angle θ*, that is, so that the steering angle deviation Δe approaches 0.

The vibration removal filter 401 shown in FIG. 3 is provided in an input path of the steering angle signal "in calculations on a steering angle signal loop of steering angle control", and the steering angle θ_flt after filter processing by the vibration removal filter 401 is input to the steering angle deviation calculator 33. As will be described in detail later, the vibration removal filter 401 removes vibration frequency components of the LDW.

When the LDW activation request flag F2 is input from the LDW-ECU 17, the vibration application control unit 50 calculates the LDW control torque command Tv* so as to apply vibration to the assist torque to make the driver aware of it.

A command adder 60 calculates a final assist torque command Tm*, which is the sum of the assist torque command Ta*, the steering angle control torque command Tθ*, and the LDW control torque command Tv*, and outputs it to the motor drive control unit 65. The motor drive control unit 65 drives the motor 80 by applying a drive voltage Vd to the motor 80 according to the final assist torque command Tm*. Thereby, the motor 80 outputs the assist torque Ta corresponding to the final assist torque command Tm*.

Figure 4:
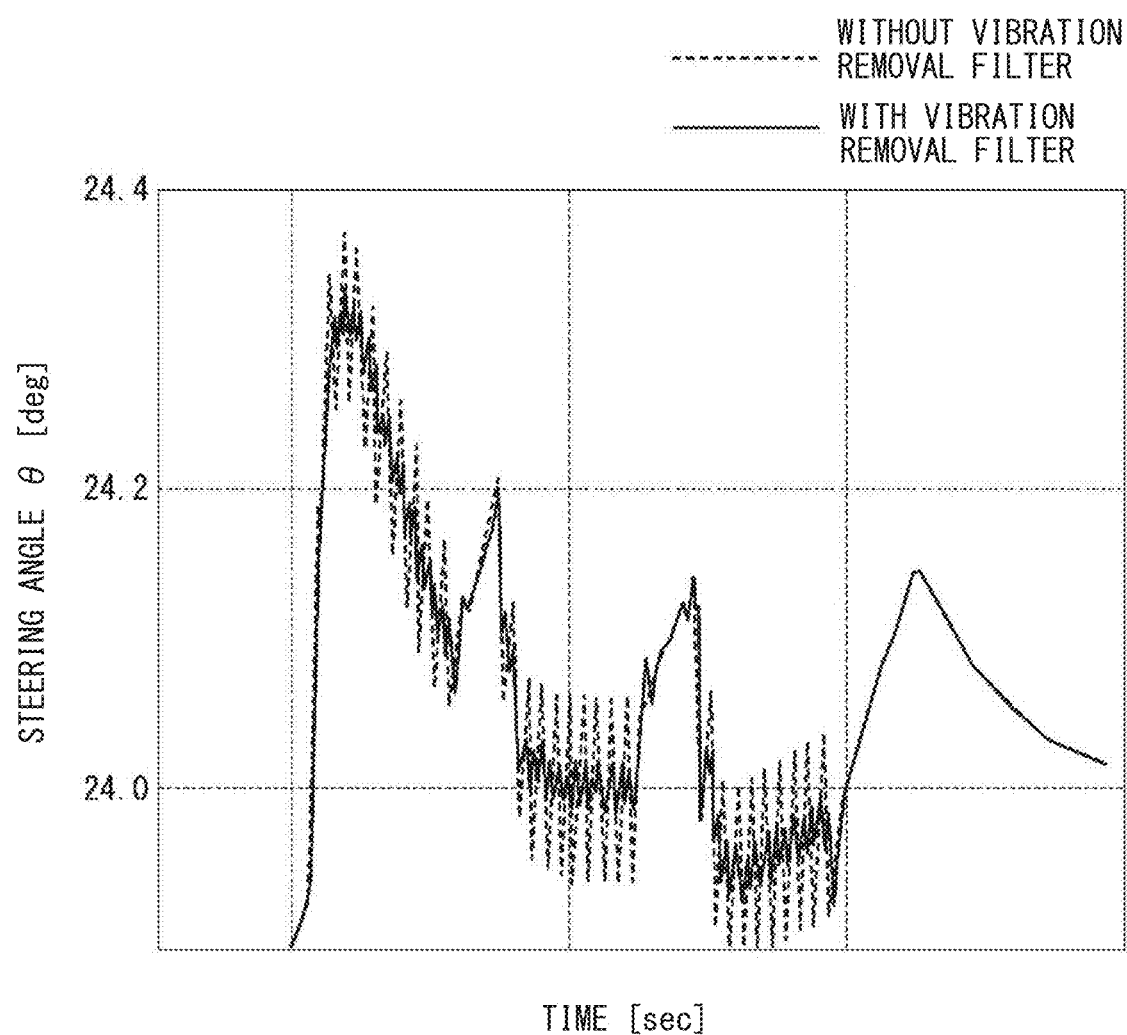
FIG. 4 is a time chart showing an action of a vibration removal filter on a steering angle signal.

Referring to FIG. 4, an action of the vibration removal filter 401 on the steering angle signal will be described. A broken line indicates the steering angle signal input to the steering angle deviation calculator 33 when the vibration removal filter is not provided, and the solid line indicates the steering angle signal input to the steering angle deviation calculator 33 when the vibration removal filter 401 is provided.

In a case where the vibration removal filter is not provided, when the steering angle θ fluctuates due to the LDW control torque command Tv*, in the steering angle control, the steering angle control torque command Tθ* is calculated so that the steering angle deviation Δθ between the target steering angle θ* and the steering angle θ approaches 0. As a result, the motor rotation angle, which is the result of applying vibration using the LDW control torque command Tv*, and the resulting steering torque Ts become smaller than when the steering angle control is not activated.

On the other hand, when the steering angle signal processed by the vibration removal filter 401 is used, it is recognized that there is no vibration or the vibration is small for steering angle control. Therefore, it is possible to prevent the steering angle control from interfering with the vibrations applied by the LDW control. As a result, vibrations in the steering torque Ts can be generated in the same way as during normal assist. Therefore, the driver can recognize the warning.

Next, a frequency characteristics of the vibration removal filter will be explained. In this explanation, "40" is used comprehensively as the code for the vibration removal filter. The control band of steering angle control by the LKA control is, for example, a band from DC to 5 Hz or less. Compared to this band, the vibration frequency of the LDW is set to a higher frequency band (for example, around 20 Hz) that allows people to recognize it as a warning. The vibration removal filter 40 used in steering angle control has a characteristic of attenuating the gain near the vibration frequency of the LDW.

Figure 5:
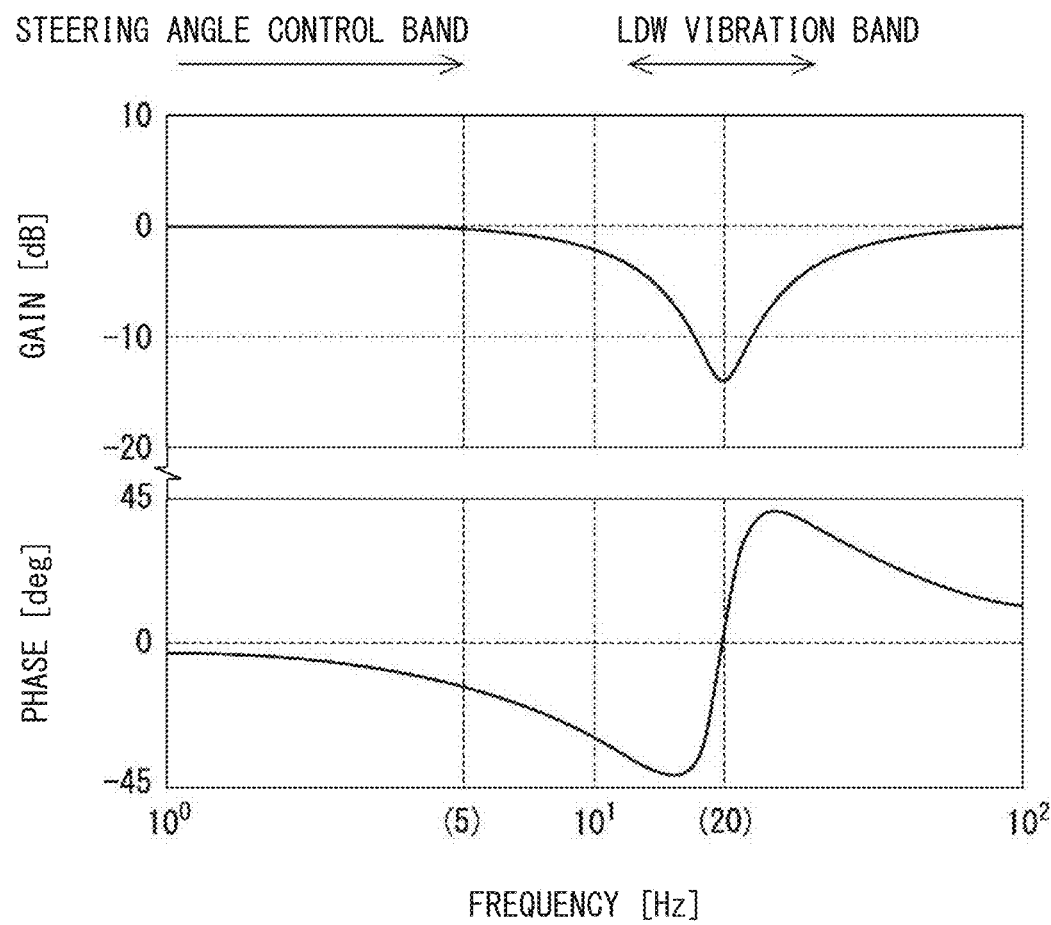
FIG. 5 is a frequency characteristic diagram of a vibration removal filter in an example configured with a notch filter.
Figure 6:
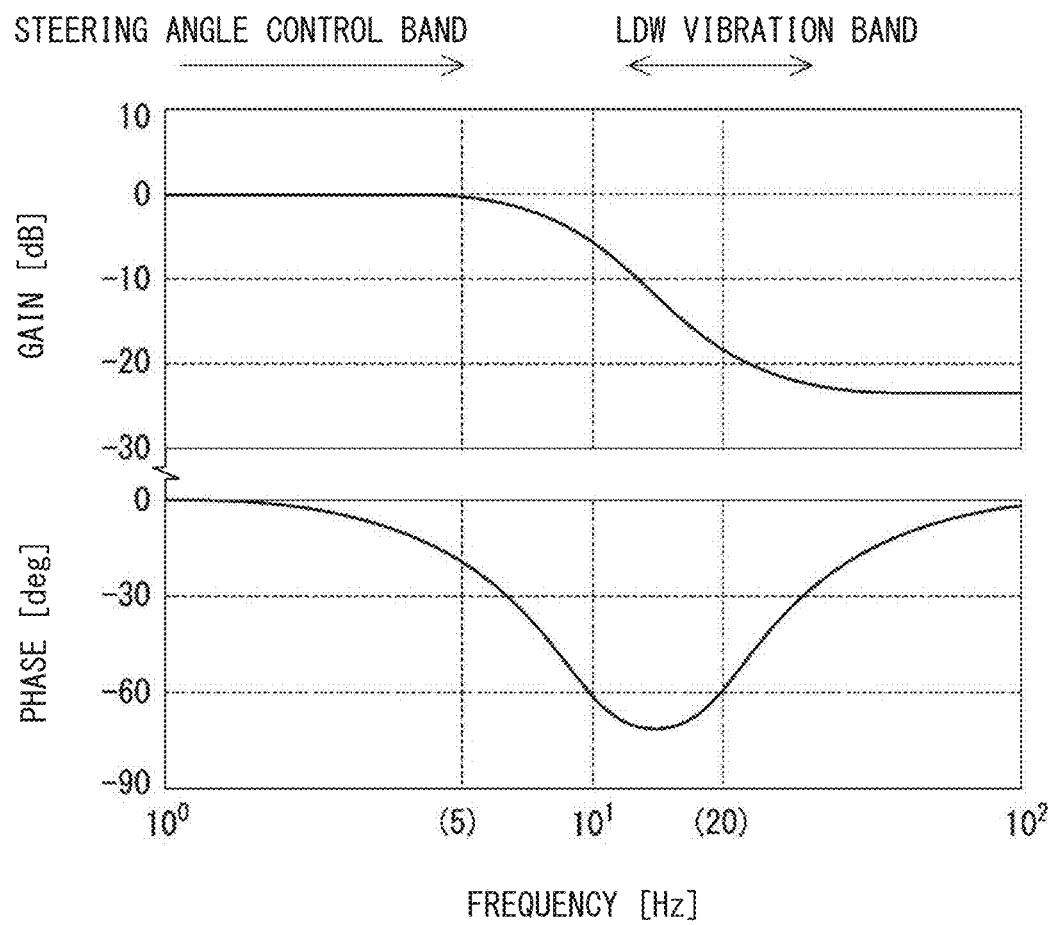
FIG. 6 is a frequency characteristic diagram of a vibration removal filter in an example configured with primary lag filters arranged in series in multiple stages.

Examples of frequency characteristics of the vibration removal filter 40 are shown in FIGS. 5 and 6. The vibration removal filter 40 in the example shown in FIG. 5 is composed of a notch filter that attenuates specific frequency components. The vibration removal filter 40 shown in the example shown in FIG. 6 is composed of a filter that reduces the gain at a certain frequency or higher by a predetermined level. Specifically, for example, a plurality of stages of primary lag filters are arranged in series.

For example, while the steering angle control band is 5 Hz or less, the LDW vibration band is around 20 Hz. In this way, the vibration frequency of the LDW is set to a higher frequency band than the frequency band used for steering angle control. The gain in the steering angle control band is 1, and the vibration removal filter 40 passes the frequency components of the steering angle control band as y are.

Next, the behavior when the LDW control is activated will be explained with reference to the time charts of FIGS. 7 to 9. Here, a case is simulated in which the LDW control vibrations are applied three times while the vehicle is traveling straight at 100 km/h. The LDW control torque command, the assist torque, the steering torque, and the steering angle are shown in order from the top of each figure.

Figure 7:
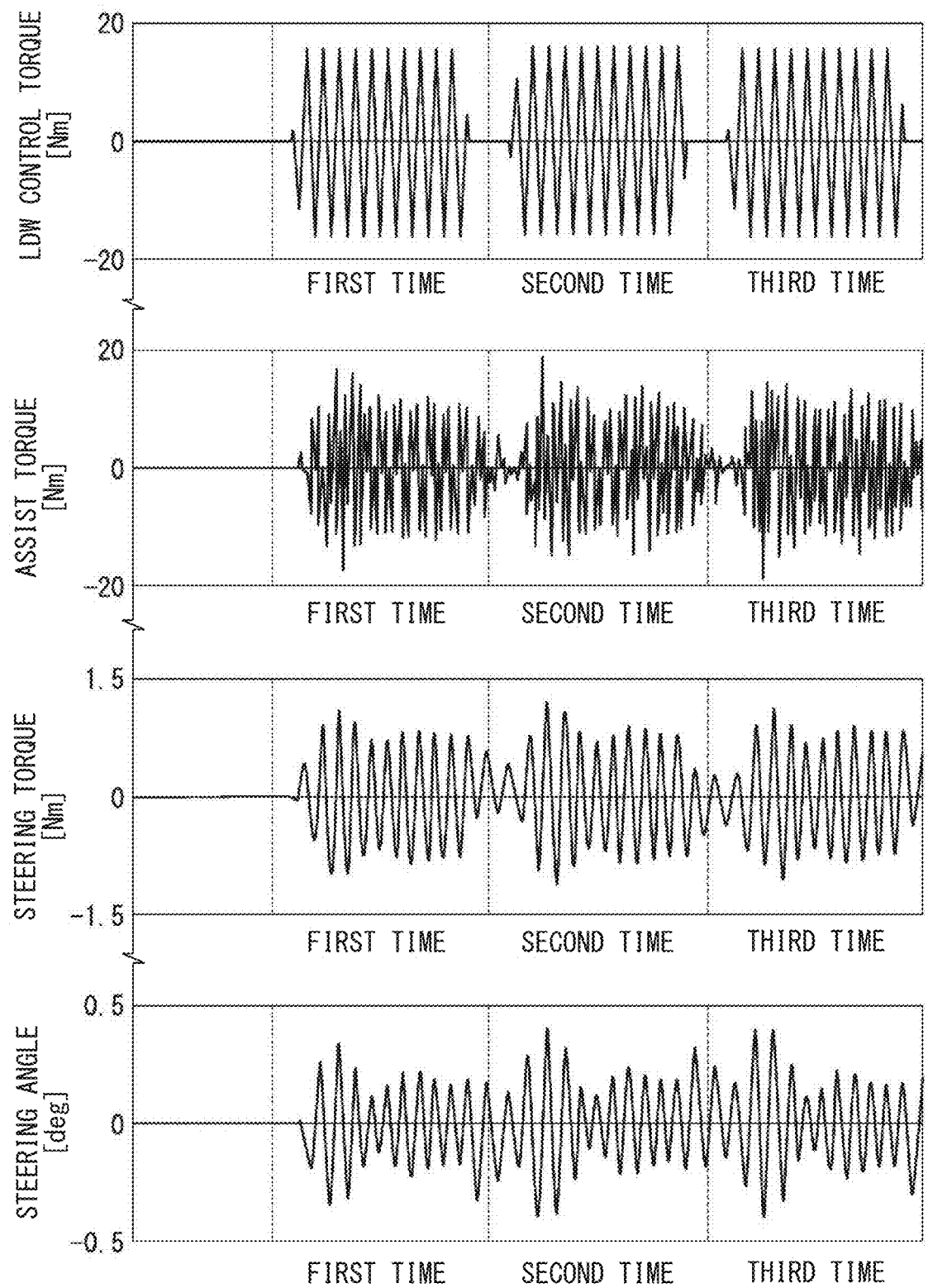
FIG. 7 is a time chart showing a behavior when LDW control is activated during normal assist.

As shown in FIG. 7, when the LDW control is activated during normal assist in driver steering, the steering torque and steering angle fluctuate at a level that allows the driver to easily recognize the warning.

Figure 8:
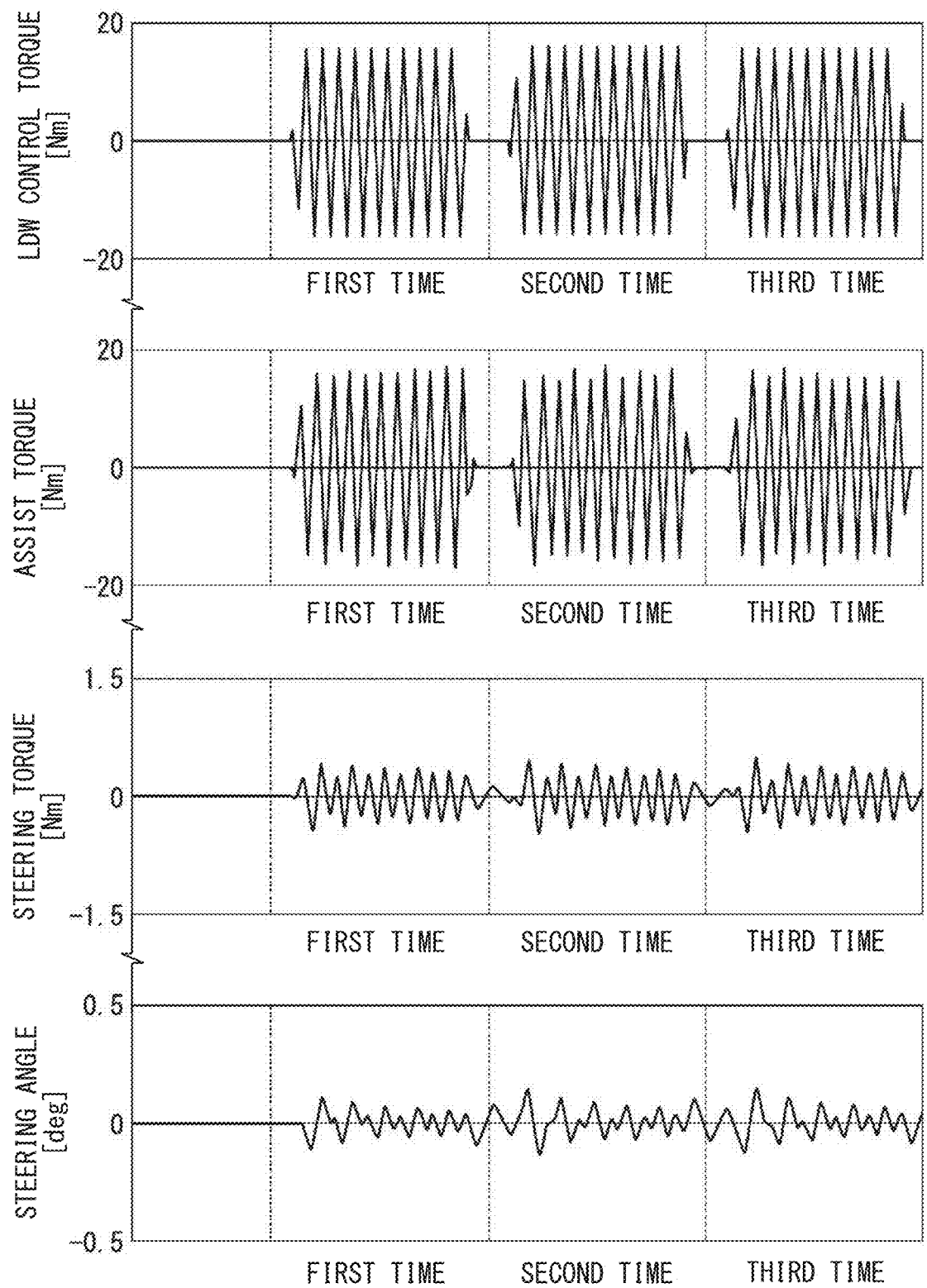
FIG. 8 is a time chart showing a behavior when LDW control is activated during LKA control in a comparative example (without vibration removal filter)

As shown in FIG. 8, in the comparative example having no vibration removal filter, when the LDW control is activated during the LKA control, the fluctuations in the steering torque and steering angle are small. Regarding the steering torque, the vibrations applied by the LDA control become smaller due to the interference of the LKA control, so it becomes difficult for the driver to recognize the warning because it is mixed in with the vibrations of the road surface during driving. Further, regarding the steering angle, the steering angle is maintained by the steering angle control so as to follow the command of 0 degrees, which is the target steering angle of the LKA control.

Figure 9:
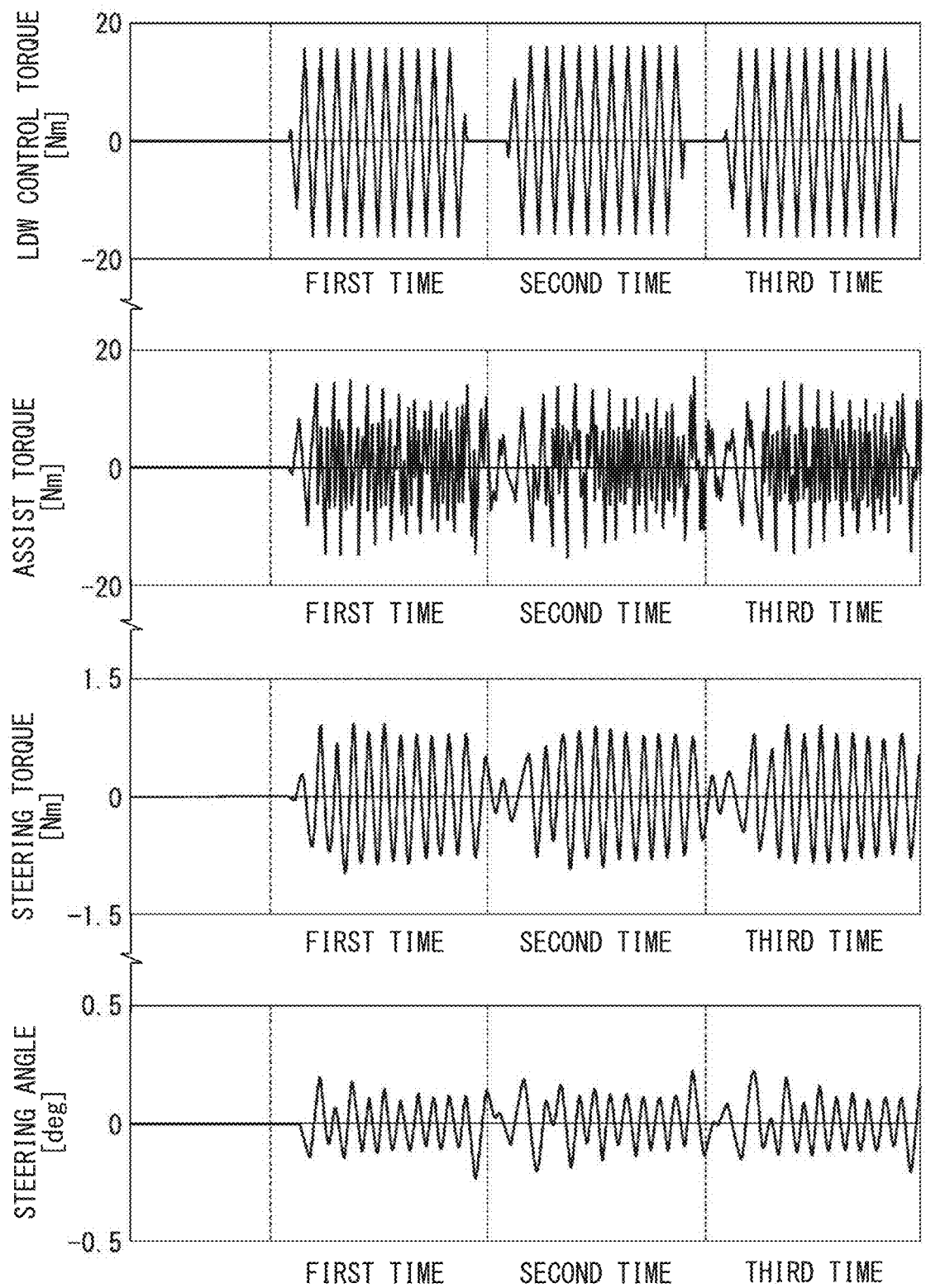
FIG. 9 is a time chart showing a behavior when LDW control is activated during LKA control in one embodiment (with vibration removal filter)

As shown in FIG. 9, in this embodiment using the vibration removal filter 40, when the LDW control is activated during the LKA control, the fluctuation in the steering torque Ts is larger than in the comparative example shown in FIG. 8. That is, by using the vibration removal filter 40, it is possible to generate vibrations comparable to the steering torque during normal assist. Therefore, the driver can recognize the warning.

As described above, in the present embodiment, a desired LDW vibration torque can be generated by not suppressing the motor angle fluctuation of the LDW vibration frequency when the steering angle control by the LKA control is operating. Therefore, the driver can recognize the warning even while the LKA control is in operation.

Further, the vibration frequency of the LDW is set to a higher frequency band than the frequency band used for steering angle control, and the vibration removal filter 40 passes the frequency components of the steering angle control band as they are. Therefore, the followability of steering angle control is ensured without deterioration.

Patent Document 1 describes a technique that increases the LDW vibration torque as the driver's steering torque increases, thereby making it easier for the driver to recognize the warning. For example, based on this technique, a method of increasing the vibration amplitude of the LDW when steering angle control is activated in automatic steering is envisaged.

However, as the servo ability for steering angle control increases, it becomes necessary to greatly increase the vibration amplitude. Therefore, there are concerns that the stability of the system will be compromised, and vibration convergence will worsen, or that the vibration amplitude will become inappropriate during the transition process when steering angle control is interrupted due to a fail or driver override operation.

In contrast, the present embodiment suppresses the influence of steering angle control on the LDW control by reducing only the followability in a specific frequency band during steering angle control without changing the vibration amplitude of the LDW itself. Therefore, it is possible to avoid a decrease in the stability of the system and the generation of inappropriate vibrations during the transition process of steering angle control.

Other Embodiments (1) The steering angle control unit of the present disclosure may include a vibration removal filter "in calculations on the steering angle signal loop of the steering angle control". FIGS. 10A and 10B show configuration examples of a steering angle control unit of another embodiment different from the steering angle control unit 301 shown in FIG. 3.

The steering angle control unit 302 shown in FIG. 10A includes a vibration removal filter 402 between the steering angle deviation calculator 33 and the steering angle servo controller 34. The vibration removal filter 402 removes components of the LDW vibration frequency band included in the steering angle deviation $\Delta e$.

The steering angle control unit 303 shown in FIG. 10B includes a vibration removal filter 403 on the output side of the steering angle servo controller 34. The vibration removal filter 403 outputs a steering angle control torque command $T\theta^*$ from which components of the LDW vibration frequency band have been removed. This suppresses the influence of steering angle control on vibrations imparted by the LDW control.

In any of the steering angle control units 301 to 303 shown in FIGS. 3, 10A, and 10B, by suppressing interference with the LDW control, vibrations in the steering torque Ts can be generated in the same manner as during normal assist. Therefore, the driver can recognize the warning. Furthermore, without being limited to the configurations shown in FIGS. 10A and 10B, a vibration removal filter may be used in which either or both of the proportional term and the differential term of the PID calculator 36 have a high degree of contribution to the LDW vibration.

(2) The frequency characteristics of the vibration removal filter 40 are not limited to the filters illustrated in FIGS. 5 and 6. Instead of a series arrangement of multiple stages of primary lag filters, a filter that operates in the form of an integrated transfer function, for example, may be used. Any filter with any characteristics may be used, as long as it is capable of removing at least components of the LDW vibration frequency band, regardless of its relationship to the frequency band of steering angle control.

The present disclosure is not limited to such embodiments but can be implemented in various forms without deviating from the spirit of the present disclosure.

The controller and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. A computer program may be stored in a computer-readable non-transitory tangible recording medium as an instruction executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A steering control device for assisting a driver in steering using an assist torque output from a motor in a vehicle equipped with a lane keeping support device and a lane departure warning device, the steering control device, comprising:
   an assist control unit configured to calculate an assist torque command based on the steering torque;
   a steering angle control unit configured to calculate a steering angle control torque command so that a steering angle determined according to an output of the motor follows a target steering angle commanded from the lane keeping support device;
   a vibration application control unit configured to calculate a lane departure warning control torque command so as to apply vibration to an assist torque when a lane departure warning activation request is notified from the lane departure warning device; and
   a motor drive control unit configured to control a drive of the motor based on an addition value of the assist torque command, the steering angle control torque command, and the lane departure warning control torque command;
   wherein
   the steering angle control unit includes a vibration removal filter configured to remove vibration frequency components of the lane departure warning device in calculations on a steering angle signal loop for steering angle control.

2. The steering control device according to claim 1, wherein
   a vibration frequency of the lane departure warning is set to a higher frequency band than the frequency band used for steering angle control, and
   the vibration removal filter passes frequency components in a steering angle control band as is.

3. The steering control device according to claim 1, wherein
   the vibration removal filter is a notch filter that attenuates specific frequency components.

4. The steering control device according to claim 1, wherein
   the vibration removal filter is configured to reduce a gain of a specific frequency or higher by a predetermined level.

5. A steering control device for assisting a driver in steering using an assist torque output from a motor in a vehicle equipped with a lane keeping support device and a lane departure warning device, the steering control device, comprising:
   a computer including a processor and a memory that stores instructions configured to, when executed by the processor, cause the processor to
   calculate an assist torque command based on the steering torque,
   calculate a steering angle control torque command so that a steering angle determined according to an output of the motor follows a target steering angle commanded from the lane keeping support device,
   calculate a lane departure warning control torque command so as to apply vibration to an assist torque when a lane departure warning activation request is notified from the lane departure warning device, and
   control a drive of the motor based on an addition value of the assist torque command, the steering angle control torque command, and the lane departure warning control torque command,
   wherein
   a vibration removal filter configured to remove vibration frequency components of the lane departure warning device is provided in calculations on a steering angle signal loop for steering angle control.

6. The steering control device according to claim 5, wherein
   a vibration frequency of the lane departure warning is set to a higher frequency band than the frequency band used for steering angle control, and
   the vibration removal filter passes frequency components in a steering angle control band as is.

7. The steering control device according to claim 5, wherein
   the vibration removal filter is a notch filter that attenuates specific frequency components.

8. The steering control device according to claim 5, wherein
   the vibration removal filter is configured to reduce a gain of a specific frequency or higher by a predetermined level.

* * * * *